United States Patent Office 3,308,120
Patented Mar. 7, 1967

3,308,120
7 - (NITROGEN - CONTAINING HETEROCYCLIC CARBONAMIDO) CEPHALOSPORANIC ACID AND DERIVATIVES THEREOF
Tadayoshi Takano, Hirakata, Kiyoshi Hattori, Ibaragi, Kazuo Nakanishi and Kazuko Miura, Osaka, Suminori Umio, Nishinomiya, and Teiji Kishimoto, Kyoto, Japan, assignors to Fujisawa Pharmaceutical Co., Ltd., Higashi-ku, Osaka, Japan, a company of Japan
No Drawing. Filed July 20, 1965, Ser. No. 473,508
Claims priority, application Japan, July 23, 1964, 39/42,132
13 Claims. (Cl. 260—243)

This invention relates to 7-(nitrogen-containing heterocyclic carbonamido) cephalosporanic acid and derivatives thereof, which compounds are useful as antimicrobial agents.

The compounds of this invention may be represented by the following structural formula (I):

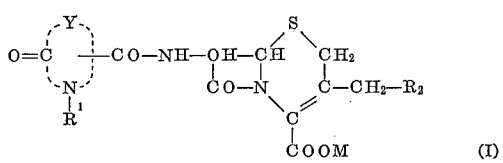

wherein $R_1$ is hydrogen atom, lower alkyl, cycloalkyl or aralkyl radical; $R_2$ is acetoxy or pyridinium group; Y is propylene —$(CH_2)_3$— or 1,3-butadiene —$(CH=CH)_2$—, each of which is substituted or unsubstituted with lower alkyl radical; and M is hydrogen atom, a pharmaceutically acceptable non-toxic cation or an anionic charge.

As used herein, the term "lower" is intended to mean groups containing one to six carbon atoms.

In the above formula, when $R_1$ is cycloalkyl it includes cyclopentyl, cyclohexyl, etc., when $R_1$ is aralkyl it includes benzyl, phenethyl, etc., and when M is a pharmaceutically acceptable non-toxic cation it includes, for example, the alkali metal ion such as sodium ion or potassium ion, the ammonium ion and the organic quaternary ammonium cation such as triethylammonium, dicyclohexylammonium, diphenylenediammonium or dibenzylethylene diammonium.

The compound (I) of this invention may be prepared by reacting 7-aminocephalosporanic acid or a derivative thereof having the formula (II):

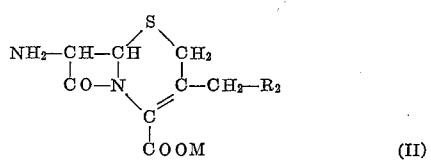

with nitrogen-containing heterocyclic carboxylic acid having the formula (III):

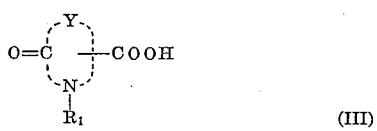

or a reactive derivative thereof, wherein $R_1$, $R_2$ and M are the same as those described in Formula I.

7-aminocephalosporanic acid (7-amino-3-acetoxymethyl-3-cephem-4-carboxylic acid) which is one of the starting material of Formula II is a known compound in the art and can be obtained upon hydrolysis of antibiotic Cephalosporin C [Biochemical Journal 79, 408–416 (1961)].

When using a nitrogen-containing heterocyclic carboxylic acid, the reaction is preferably carried out in the presence of a condensing agent such as dicyclohexylcarbodiimide, N - cyclohexyl - N'-morpholinoethylcarbodiimide, pentamethyleneketene - N - cyclohexylimine N-ethyl-o-phenylisoxazolium-3'-sulfonate, phosphorus, trichloride, etc. Under such circumstances, it is believed that the reaction may mainly proceed through an active form of the carboxyl radical in the nitrogen-containing heterocyclic carboxylic acid or of the amino radical in 7-aminocephalosporanic acid.

Examples of the reactive derivatives of the nitrogen-containing heterocyclic carboxylic acid to be frequently used are the acid halide, acid azide, mixed acid anhydride with alkylphosphoric acid or alkylcarbonic acid, acid amide with imidazole or 4-substituted imidazole, acid cyanomethyl ester, acid p-nitrophenyl ester and so forth. These reactive derivatives are suitably selected in accordance with the kinds of the nitrogen-containing heterocyclic carboxylic acid to be used.

The reaction is usually carried out in the presence of a solvent. In the solvents may be mentioned acetone, dioxane, acetonitrile, chloroform, ethylene chloride, tetrahydrofuran, or other organic solvents which are inert in the reaction and are used commonly. Of these solvents the hydrophylic ones may be used with water.

Also, the reaction may be carried out in the presence of a base such as alkali metal hydrogen carbonate, trialkylamine, pyridine, etc. The reaction is carried out in most cases under cooling or at room temperature though the temperature is not particularly limited.

After completion of the reaction, the reaction product is separated according to the conventional methods known in the arts.

When using the compound of Formula II wherein M is a pharmaceutically acceptable non-toxic cation as a starting compound, an object compound of Formula I wherein M is hydrogen is mainly obtained, because the dissociation of the cation tends to occur during the separation of the reaction product. Therefore, if it is desired to obtain the object compound of Formula I wherein M is a pharmaceutically acceptable non-toxic cation, the compound of Formula I wherein M is hydrogen is treated with an appropriate compound such as sodium hydroxide, potassium hydroxide, sodium α-ethylhexanoate, triethylamine, dicyclohexylamine, diphenylenediamine or dibenzylethylenediamine.

In addition, the compound of Formula I wherein $R_3$ is pyridinium may be obtained by reacting the compound of Formula I wherein $R_3$ is acetoxy, with pyridine.

Both 7-aminocephalosporanic acid or a derivative thereof of Formula II to be used in the reaction of this invention and the object Compound I are comparatively unstable and tend to decompose during treatment. Therefore, it is preferable to carry out the reaction and separation under mild condition.

Thus obtained compound of Formula I not only demonstrates resistance to penicillinase and an acid but exhibits advantageous physiological properties and activity against a wide variety of micro-organisms.

Also, the compound of Formula I shows high blood levels after oral administration to mice.

The following examples will illustrate the types of compounds available in accordance with this invention.

In the examples, "MIC" means a minimum inhibitory concentration which is measured by the serial dilution method commonly employed in bioassay of antimicrobial compounds, and *Escherichia coli* and *Staphylococcus aureus* are referred to as "E. coli" and "St. aureus," respectively.

EXAMPLE 1

*(i) 7-(5-oxopyrrolidine-2-carbonamido) cephalosporanic acid*

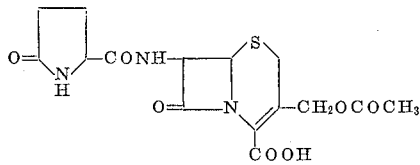

5-oxopyrrolidine-2-carboxylic acid (322 mg.) was dissolved in 20 cc. of tetrahydrofuran and 6 cc. of tetrahydrofuran solution containing dicyclohexylcarbodiimide (100 mg./cc.), and stirred for 30 minutes at room temperature. To this solution was added 10 cc. of an aqueous solution containing 680 mg. of 7-aminocephalosporanic acid and 210 mg. of sodium hydrogen carbonate within one minute and after stirring for 3.5 hours at room temperature, allowed to stand overnight. The reaction mixture was filtered and tetrahydrofuran was distilled off from the filtrate under reduced pressure. The water layer obtained after taking off an oily substance from the residue was adjusted to pH 1.0 with 10% hydrochloric acid and extracted with 150 cc. of ethyl acetate. The extract was washed with water, then dried over magnesium sulfate and ethyl acetate was distilled off under reduced pressure to obtain faint yellow powders. The faint yellow powders thus obtained were dissolved in acetone and filtered. From the filtrate, acetone was distilled off under reduced pressure and the resultant residue was washed with ether to obtain 285 mg. of 7-(5-oxopyrrolidine-2-carbonamido) cephalosporanic acid as faint yellow powders.

*(ii) Dicyclohexylamine salt of 7-(5-oxopyrrolidine-2-carbonamido) cephalosporanic acid*

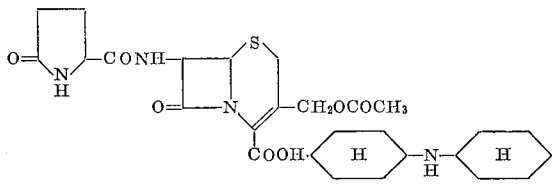

The substance (285 mg.) above obtained was dissolved in 10 c.c. of acetone and to this solution was added an acetone solution of dicyclohexylamine. From the reaction mixture, acetone was distilled off under reduced pressure and the resultant residue was washed with ether to obtain 110 mg. of dicyclohexylamine salt of 7-(5-oxopyrrolidine-2-carbonamido) cephalosporanic acid as faint yellow powders having M.P. 120–125° C. (dec.)

MIC.: *E. coli* >40γ/cc., *St. aureus* 40γ/cc.

EXAMPLE 2

*7-(1-methyl-6-oxonicotinamido) cephalosporanic acid*

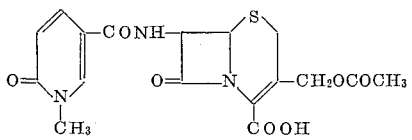

To 300 mg. of 1-methyl-6-oxonicotinoyl chloride in 10 cc. of chloroform was added 500 mg. of 7-aminocephalosporanic acid in 30 cc. of chloroform and 0.5 cc. of triethylamine under cooling to 0–5° C. This solution was stirred for 3 hours at room temperature and allowed to stand overnight. The reaction mixture was added with 10 c.c. of water and adjusted to pH 1.0. Chloroform was distilled off from the chloroform layer. The residue was dissolved in acetone and filtered. The resultant residue was then dissolved in acetone and the solution was filtered, after which acetone was distilled off from the filtrate. The residue was washed with petroleum ether to obtain 27 mg. of 7-(1-methyl-6-oxonicotinamido) cephalosporanic acid as powders having M.P. 114–125° C. (dec.).

UV: $\lambda_{max.}^{80\% \ C_2H_5OH \cdot NaOH}$ 255 mμ, E 432; mμ, E 189.

MIC.: *E. coli* >γ/cc., *St. aureus* 40γ/cc.

EXAMPLE 3

*7-(1-propyl-5-oxopyrrolidine-3-carbonamido) cephalosporanic acid*

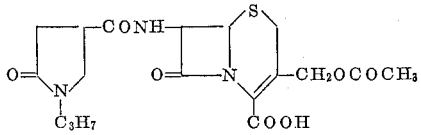

To 325 mg. of 1-propyl-5-oxopyrrolidine-3-carboxylic acid dissolved in 10 cc. of tetrahydrofuran was added 2 cc. of tetrahydrofuran solution of 430 mg. of dicyclohexylcarbodiimide, and stirred for 30 minutes at room temperature. To this solution were added dropwise 540 mg. of 7-aminocephalosporanic acid and 168 mg. of sodium hydrogen carbonate in 10 cc. of tetrahydrofuran and 10 cc. of water and allowed to stand overnight. Then, the reaction mixture was added with 0.5 cc. of tetrahydrofuran solution containing dicyclohexylcarbodiimide (200 mg./cc.) and stirred for 6 hours at room temperature and then for one day in a cold place. The reaction mixture was filtered and tetrahydrofuran was distilled off from the filtrate under reduced pressure. The residual solution was also filtered after adjusting the pH to 7.2 with sodium hydrogen carbonate. The filtrate was adjusted to pH 2.0 with hydrochloric acid and extracted with ethyl acetate. The resultant extract was condensed under reduced pressure and the residue was washed with petroleum ether to obtain 208 mg. of 7-(1-propyl-5-oxopyrrolidine-3-carbonamido) cephalosporanic acid as powders having M.P. 73–80° C. (dec.).

UV: $\lambda_{max.}^{80\% \ C_2H_5OH \cdot NaOH}$ 265.5 mμ, E 105.

MIC.: *E. coli* >40γ/cc., *St. aureus* 1.25 γ/cc.

EXAMPLE 4

*(i) 7-(1-cyclohexyl-5-oxopyrrolidine-3-carbonamido) cephalosporanic acid*

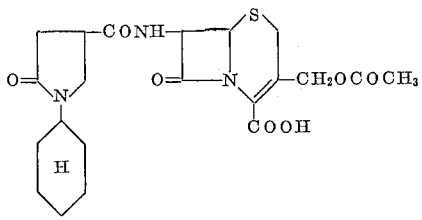

1-cyclohexyl-5-oxopyrrolidine-3-carboxylic acid (446 mg.) and 430 mg. of dicyclohexylcarbodiimide were dissolved in 15 cc. of tetrahydrofuran and stirred for 20 minutes at room temperature. To this solution were added dropwise 500 mg. of 7-aminocephalosporanic acid and 151 mg. of sodium hydrogen carbonate in 10 cc. of tetrahydrofuran and 10 cc. of water, and the solution was stirred for 5 hours at room temperature. To the thus obtained solution was further added 107 mg. of dicyclohexylcarbodiimide and stirred for 4 hours after allowing to stand for one hour at room temperature. The reaction mixture was filtered and tetrahydrofuran was distilled off from the filtrate under reduced pressure. The residue, adjusting the pH to 7.2 with sodium hydrogen carbonate, was filtered and the filtrate was extracted with ethyl acetate after adjusting the pH to 2.0 with hydrochloric acid. The extract was condensed under reduced pressure and the resultant residue was washed with ether to obtain 275 mg. of 7-(1-cyclohexyl-5-oxopyrrolidine-3-carbonamido) cephalosporanic acid as powders having M.P. 134–140° C. (dec.).

UV: $\lambda_{max.}^{80\% \, C_2H_5OH\cdot NaOH}$ 263.5 mμ, E 145.
MIC.: *E. coli* >40γ/cc., *St. aureus* 1γ/cc.

(ii) *7-(1-cyclohexyl-5-oxopyrrolidine-3-carbonamido)-3-pyridiniummethyl-decephalosporanic acid inner salt*

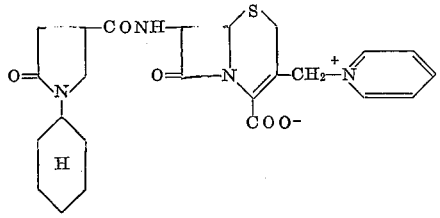

7-(1-cyclohexyl - 5 - oxopyrrolidine-3-carbonamido) cephalosporanic acid (300 mg.) was dissolved in 6 cc. of water and 2 cc. of pyridine and allowed to stand at 37° C. for 45 hours, after which the solvent was distilled off under reduced pressure. The resulting precipitate was washed with acetone to obtain 200 mg. of 7-(1-cyclohexyl-5-oxopyrrolidine - 3 - carbonamido)-3-pyridiniummethyl-decephalosporanic acid inner salt as yellowish brown powders having M.P. 82–86° C. (dec.).

UV: $\lambda_{max.}^{H_2O}$ 258 mμ, E 155.1.

(iii) *Sodium salt of 7-(1-cyclohexyl-5-oxopyrrolidine-3-carbonamido) cephalosporanic acid*

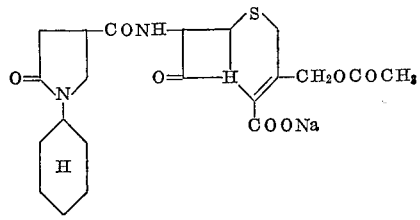

The substance (100 mg.) obtained in (i) was suspended in 10 cc. of aqueous acetone. To this suspension was added dropwise sodium α-ethyl hexanoate. The solvent was completely distilled off under reduced pressure. The residue was recrystallized from ethanol to obtain 25 mg. of sodium salt of 7-(1-cyclohexyl-5-oxopyrrolidine-3-carbonamido) cephalosporanic acid as brown powders having M.P. 200–215° C. (dec.).

UV: $\lambda_{inf.}^{H_2O}$ 255 mμ, E 126.1.

(iv) *Dicyclohexylamine salt of 7-(1-cyclohexyl-5-oxopyrrolidine-3-carbonamido) cephalosporanic acid*

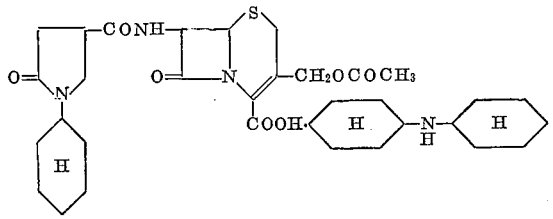

The substance obtained in (i) was dissolved in acetone. To this solution was added an acetone solution of dicyclohexylamine and the reaction mixture was allowed to stand. The resulting precipitate was recrystallized from 90% ethanol to obtain dicyclohexylamine salt of 7-(1-cyclohexyl - 5 - oxopyrrolidine-3-carbonamido) cephalosporanic acid having M.P. 179–180° C. (dec.).

UV: $\lambda_{max.}^{95\% \, C_2H_5OH}$ 262 mμ, E 171.

EXAMPLE 5

*7-(1-benzyl-5-oxopyrrolidine-3-carbonamido) cephalosporanic acid*

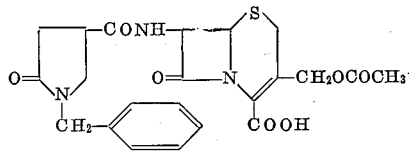

1-benzyl-5-oxopyrrolidine-3-carboxylic acid (320 mg.) in 1.8 cc. of tetrahydrofuran solution of dicyclohexylcarbodiimide (0.2 g./cc.), was dissolved in 10.0 cc. of tetrahydrofuran and stirred for 30 minutes at room temperature. This solution was added dropwise to a solution of 500 mg. of 7-aminocephalosporanic acid and 160 mg. of sodium hydrogen carbonate in 10 cc. of tetrahydrofuran and 10 cc. of water. The mixture was stirred for 5.5 hours, after which 0.5 cc. of additional dicyclohexylcarbodiimide solution was added, allowed to stand overnight and stirred for 3 hours at room temperature. The reaction mixture thus obtained was filtered and tetrahydrofuran was distilled off from the filtrate under reduced pressure. The residual solution was adjusted to pH 7.2 and filtered. The resultant filtrate, adjusting the pH to 2.0 with hydrochloric acid, was extracted with ethyl acetate. The extract solution was condensed under reduced pressure and washed with ether to obtain 287 mg. of 7-(1-benzyl - 5 - oxopyrrolidine-3-carbonamido) cephalosporanic acid as powders having M.P. 120–128° C.

UV: $\lambda_{max.}^{80\% \, C_2H_5OH\cdot NaOH}$ 263 mμ, E 120.
MIC.: *E coli* 40γ/cc., *St. aureus* 1γ/cc.

EXAMPLE 6

*7-(2-ethyl-6-oxoisonicotinamido) cephalosporanic acid*

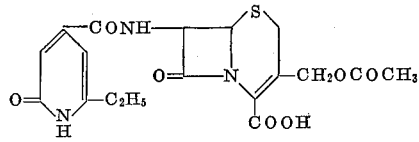

2-ethyl-6-oxoisonicotinic acid (335 mg.) was dissolved in 0.3 cc. of triethylamine, 0.17 cc. of ethyl chloroformate and 15 cc. of acetone. To this solution was added 15 cc. of an aqueous solution containing 540 mg. of 7-aminocephalosporanic acid and 340 mg. of sodium hydrogen carbonate under cooling at −15−−20° C. and stirred for 30 minutes at 0–5° C. and then for one hour at room temperature. The reaction mixture was washed with ether, adjusted to pH 2.0 with hydrochloric acid and extracted with ethyl acetate. The extract solution was condensed under reduced pressure and the obtained residue was dissolved in acetone. The acetone solution was condensed under reduced pressure to obtain 375 mg. of 7-(2-ethyl-6-oxoisonicotinamido) cephalosporanic acid as powders having M.P. 130–145° C. (dec.).

UV: $\lambda_{max.}^{80\% \, C_2H_5OH\cdot NaOH}$ 229 mμ, E 369; 328 mμ, E 115.

We claim:
1. A compound having the general formula:

$$\begin{array}{c} \text{Y} \\ O=C \quad \text{CONH-CH-CH} \quad \begin{array}{c} S \\ CH_2 \end{array} \\ \text{N} \quad \quad CO-N \quad C-CH_2-R_1 \\ R_1 \quad \quad \quad \quad C \\ \quad \quad \quad \quad \quad COOM \end{array}$$

wherein $R_1$ is hydrogen atom, lower alkyl cycloalkyl or aralkyl radical; $R_2$ is acetoxy or pyridinium group; Y is propylene —$(CH_2)_3$— or 1.3-butadiene —$(CH=CH)_2$— each of which is substituted or unsubstituted with lower alkyl radical; M is hydrogen atom, a pharmaceutically acceptable non-toxic cation or an anionic charge.

2. 7-(5-oxopyrrolidine - 2 - carbonamido)cephalosporanic acid.

3. 7-(1-methyl - 6 - oxonicotinamido)cephalosporanic acid.

4. 7-(1-propyl - 5 - oxopyrrolidine - 3 - carbonamido) cephalosporanic acid.

5. 7-(cyclohexyl-5-oxopyrrolidine - 3 - carbonamido) cephalosporanic acid.

6. 7-(1-benzyl-5-oxopyrrolidine - 3 - carbonamido) cephalosporanic acid.

7. 7-(2-ethyl - 6 - oxoisonicotinamido)cephalosporanic acid.

8. 7-(5-oxopyrrolidine - 2 - carbonamido)-3-pyridiniummethyl-decephalosporanic acid inner salt.

9. 7-(1-cyclohexyl - 5 - oxopyrrolidine - 3 - carbonamido)-3-pyridiniummethyl-decaphalosporanic acid inner salt.

10. Sodium salt of 7-(5-oxopyrrolidine - 2 - carbonamido)cephalosporanic acid.

11. Sodium salt of 7-(1-cyclohexyl-5-oxopyrrolidine-3-carbonamido)cephalosporanic acid.

12. Dicyclohexylamine salt of 7-(5-oxopyrrolidine-2-carbonamido)cephalosporanic acid.

13. Dicyclohexylamine salt of 7-(1-cyclohexyl-5-oxopyrrolidine-3-carbonamido)cephalosporanic acid.

No references cited.

NICHOLAS S. RIZZO, *Primary Examiner*.